United States Patent
Mondello et al.

(10) Patent No.: US 11,921,839 B2
(45) Date of Patent: *Mar. 5, 2024

(54) MULTIPLE DEVICE CREDENTIAL SHARING

(71) Applicant: Apple Inc., Cupertino, CA (US)

(72) Inventors: Richard J. Mondello, Mountain View, CA (US); Chelsea E. Pugh, San Francisco, CA (US); Maureen G. Daum, Mountain View, CA (US); Morgan H. Winer, Sunnyvale, CA (US); Shuchen Li, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/221,298

(22) Filed: Apr. 2, 2021

(65) Prior Publication Data

US 2021/0319091 A1    Oct. 14, 2021

Related U.S. Application Data

(63) Continuation of application No. 16/146,945, filed on Sep. 28, 2018, now Pat. No. 10,970,385, which is a
(Continued)

(51) Int. Cl.
*G06F 21/45* (2013.01)
*G06F 21/31* (2013.01)
(Continued)

(52) U.S. Cl.
CPC .............. *G06F 21/45* (2013.01); *G06F 21/31* (2013.01); *G06F 21/44* (2013.01); *H04L 63/04* (2013.01);
(Continued)

(58) Field of Classification Search
None
See application file for complete search history.

(56) References Cited

U.S. PATENT DOCUMENTS 5,987,480 A   11/1999   Donohue et al.
6,859,878 B1   2/2005   Kerr et al.
(Continued)

OTHER PUBLICATIONS

Face ID Security, Apple Inc., Nov. 2017, 6 pages.
OS Security Guide—White Paper, iOS 11, Apple Inc., Jan. 2018, 82 pages.

*Primary Examiner* — Benjamin E Lanier
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to sharing a user credential between computing devices. In some embodiments, a first computing device stores a set of user credentials usable to authenticate a user and receives, from a second computing device, a request for a user credential to be provided responsive to an authentication prompt associated with the second computing device. In such an embodiment, the request includes an indication of a service for which the authentication prompt is being presented. Based on the indication, the first computing device determines whether the stored set of user credentials includes a user credential relevant to the authentication prompt and presents a selection prompt asking a user of the first computing device to select a one of the stored set of user credentials to provide to the second computing device for authentication to the service, the relevant user credential being identified in the selection prompt.

19 Claims, 16 Drawing Sheets

Related U.S. Application Data continuation-in-part of application No. 15/721,606, filed on Sep. 29, 2017, now Pat. No. 10,824,709.

(60) Provisional application No. 62/679,911, filed on Jun. 3, 2018, provisional application No. 62/514,934, filed on Jun. 4, 2017.

(51) Int. Cl.
    *G06F 21/44*      (2013.01)
    *H04L 9/40*      (2022.01)
    *H04L 9/08*      (2006.01)

(52) U.S. Cl.
    CPC .......... *H04L 63/061* (2013.01); *H04L 63/083* (2013.01); *H04L 63/18* (2013.01); *H04L 9/085* (2013.01); *H04L 63/0428* (2013.01)

(56) References Cited

U.S. PATENT DOCUMENTS

| | | | |
|---|---|---|---|
| 8,775,757 B2 | 7/2014 | Polzin et al. | |
| 8,832,465 B2 | 9/2014 | Gulati et al. | |
| 8,873,747 B2 | 10/2014 | Polzin et al. | |
| 9,043,632 B2 | 5/2015 | Machnicki et al. | |
| 9,047,471 B2 | 6/2015 | Polzin et al. | |
| 9,547,778 B1 | 1/2017 | Paaske et al. | |
| 9,819,673 B1 | 11/2017 | Johansson et al. | |
| 9,887,975 B1* | 2/2018 | Gifford | H04W 12/0431 |
| 10,970,385 B2* | 4/2021 | Mondello | G06F 21/44 |
| 2002/0186249 A1 | 12/2002 | Lu et al. | |
| 2010/0115279 A1 | 5/2010 | Frikart et al. | |
| 2014/0007205 A1 | 1/2014 | Oikonomou | |
| 2014/0007209 A1 | 1/2014 | Zucker | |
| 2014/0101310 A1 | 4/2014 | Savage et al. | |
| 2014/0157390 A1 | 6/2014 | Lurey et al. | |
| 2014/0173708 A1 | 6/2014 | Garlick | |
| 2014/0208112 A1 | 7/2014 | McDonald et al. | |
| 2014/0289824 A1 | 9/2014 | Chan et al. | |
| 2014/0298432 A1 | 10/2014 | Brown | |
| 2015/0074615 A1 | 3/2015 | Han et al. | |
| 2015/0089579 A1 | 3/2015 | Manza et al. | |
| 2015/0281184 A1* | 10/2015 | Cooley | G06F 16/245 713/171 |
| 2015/0286737 A1 | 10/2015 | Cattone et al. | |
| 2016/0034892 A1 | 2/2016 | Carpenter et al. | |
| 2016/0105420 A1 | 4/2016 | Engan et al. | |
| 2016/0127855 A1* | 5/2016 | Zhang | H04H 60/15 455/41.2 |
| 2016/0350365 A1 | 12/2016 | Subramaniam et al. | |
| 2017/0011213 A1 | 1/2017 | Cavanagh et al. | |
| 2017/0142191 A1 | 5/2017 | Caldwell | |
| 2017/0289161 A1 | 10/2017 | Yoskowitz et al. | |
| 2017/0357830 A1 | 12/2017 | Benson et al. | |
| 2017/0373843 A1 | 12/2017 | Benson et al. | |
| 2018/0083959 A1 | 3/2018 | Barbosa et al. | |
| 2018/0287902 A1 | 10/2018 | Chitalia et al. | |

* cited by examiner

Success Prompt 1130

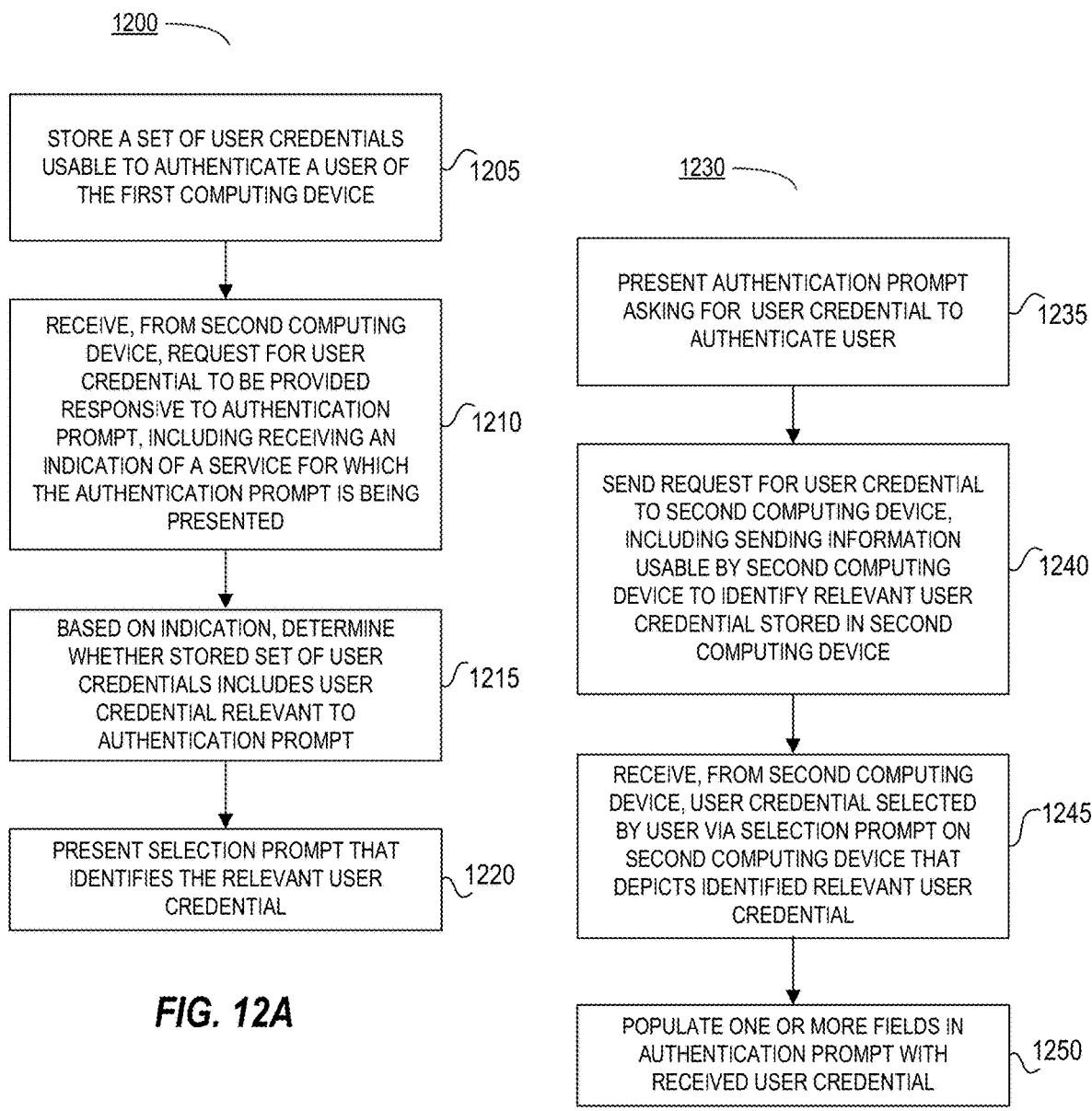

MULTIPLE DEVICE CREDENTIAL SHARING

The present application is a continuation of Ser. No. 16/146,945 filed Sep. 28, 2018 (now U.S. Pat. No. 10,970,385), which claims priority to U.S. Prov. Appl. No. 62/679,911 filed Jun. 3, 2018 and is a continuation-in-part of U.S. application Ser. No. 15/721,606 filed Sep. 29, 2017 (now U.S. Pat. No. 10,824,709), which claims priority to U.S. Prov. Appl. No. 62/514,934 filed Jun. 4, 2017; the disclosures of each of the above-referenced applications are incorporated by reference herein in their entireties.

BACKGROUND

Technical Field

This disclosure relates generally to computing devices, and, more specifically, to user authentication.

Description of the Related Art

Applications installed on devices often require a user to enter login and password information. Devices typically have many applications, and accordingly, remembering and entering login information becomes tedious to the user. Accordingly, applications, such as web browsers, often have capabilities to save login and password information. In order to secure such information, however, it is often only accessible to the web browser. Applications are often provided by entities controlling or operating related websites and other applications or services, and thus, may use the same login credentials. Accordingly, users often expect such information to be shared across applications. Developers, however, often do not explicitly provide such capabilities, and accordingly, there is a need to provide a safe mechanism to share credentials across services or applications.

BRIEF DESCRIPTION OF THE DRAWINGS

FIGS. 12A-C are a flow diagrams illustrating exemplary methods for sharing credentials.

Figure 1:
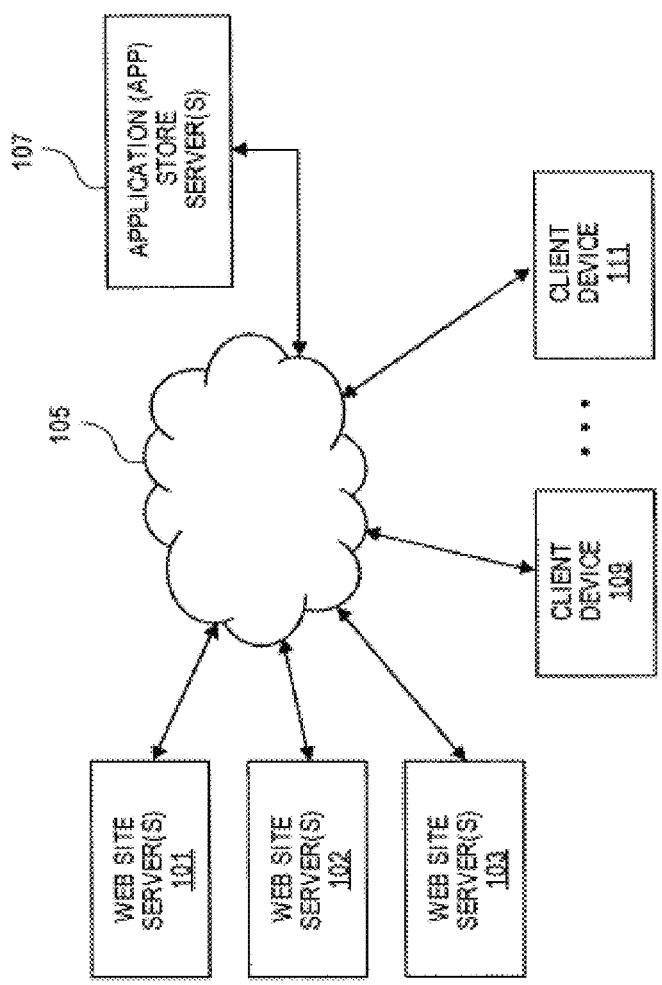
FIG. 1 is a block diagram illustrating an example operating environment according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing device configured to present a prompt on display" is intended to cover a device, for example, that has display pipeline circuitry and/or memory having program instructions executable by a processor to perform this function during operation, even if the device in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first credential and a second credential. The term "first" is not limited to the initial credential of the device. Accordingly, the term "first" may be used to refer to any credential on the device.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Introduction

The present disclosure describes embodiments in which a system may automatically populate login credentials for an application such as a third-party application (or app) installed on a device (e.g. from an app store). These applications often do not have a mechanism to retrieve previously entered login credentials (e.g. upon launching the application for the first time after installation). The applications, however, are often associated with an entity that may operate or control a related service such as a website, application, etc., which may be part of a platform. For example, a BBC News application would be an application authorized to be associated with the BBC News website. As described above, web browsers often store login credentials (e.g. username and password) of previously visited websites. Accordingly, the system may retrieve applicable login credentials for the application in response to verifying the application is authorized to be associated with the website associated with the retrieved credentials. The verification may include a process that prevents unauthorized (or malicious) access to such credentials. The system may perform a verification heuristically by determining a cross association between a particular application and a service (e.g. website). The cross association may be based on determining the application and service are authorized to cooperate in a particular manner such as sharing credentials, universal linking, continued activity, etc. as further described herein. Accordingly, the system may provide a mechanism to determine a retrieval of login credentials is safe even in instances where a developer of an application has not provided an explicit capability for such a feature.

The present disclosure begins with a discussion of how a device can verify that an application is authorized to receive a credential associated with a related service in conjunction with FIGS. 1-8. The present disclosure then discusses how a first computing device, which may perform this cross-association verification, can receive a desired credential stored on a second computing device in conjunction with FIGS. 9-12. Lastly, an exemplary computing device, which may be implement functionality described herein is presented with respect to FIG. 13.

Cross-Association Verification

FIG. 1 shows an example of such an operating environment according to an embodiment of the disclosure. A plurality of website servers or other web resources provided by servers are connected via network 15 to a plurality of client devices, such as client devices 109 and 111. The network 15 may be any wired or wireless network. Each website shown can be a distinct domain that is provided by a plurality of web servers, which may serve web content or other web resources from the domain. For example, the website servers 101 can be servers for the domain bbc.co.uk, and the website servers 102 can be servers for the domain espn.com, and the website servers 103 can be the servers for the domain xyz.com. In addition, one or more application stores can be connect to the network 15 to provide apps for downloading and installing onto the one or more client devices, such as client devices 109 and 111. As is known in the art, each client device can purchase or otherwise obtain apps from one or more app stores, such as app store servers 107 and cause those apps to be downloaded onto a client device. For example, a user of client device 109 can download an app from the BBC or ESPN or XYZ to install these apps, which are often associated with the corresponding websites (such as the BBC or ESPN or XYZ websites). The client devices 109 and 111 can be any one of a variety of data processing systems, such as smartphones, tablet computers, laptop computers, desktop computers, etc. System 1300 as described below, shows an example of an architecture for a data processing system, which can be used to implement the client devices or the servers described above.

Figure 2:
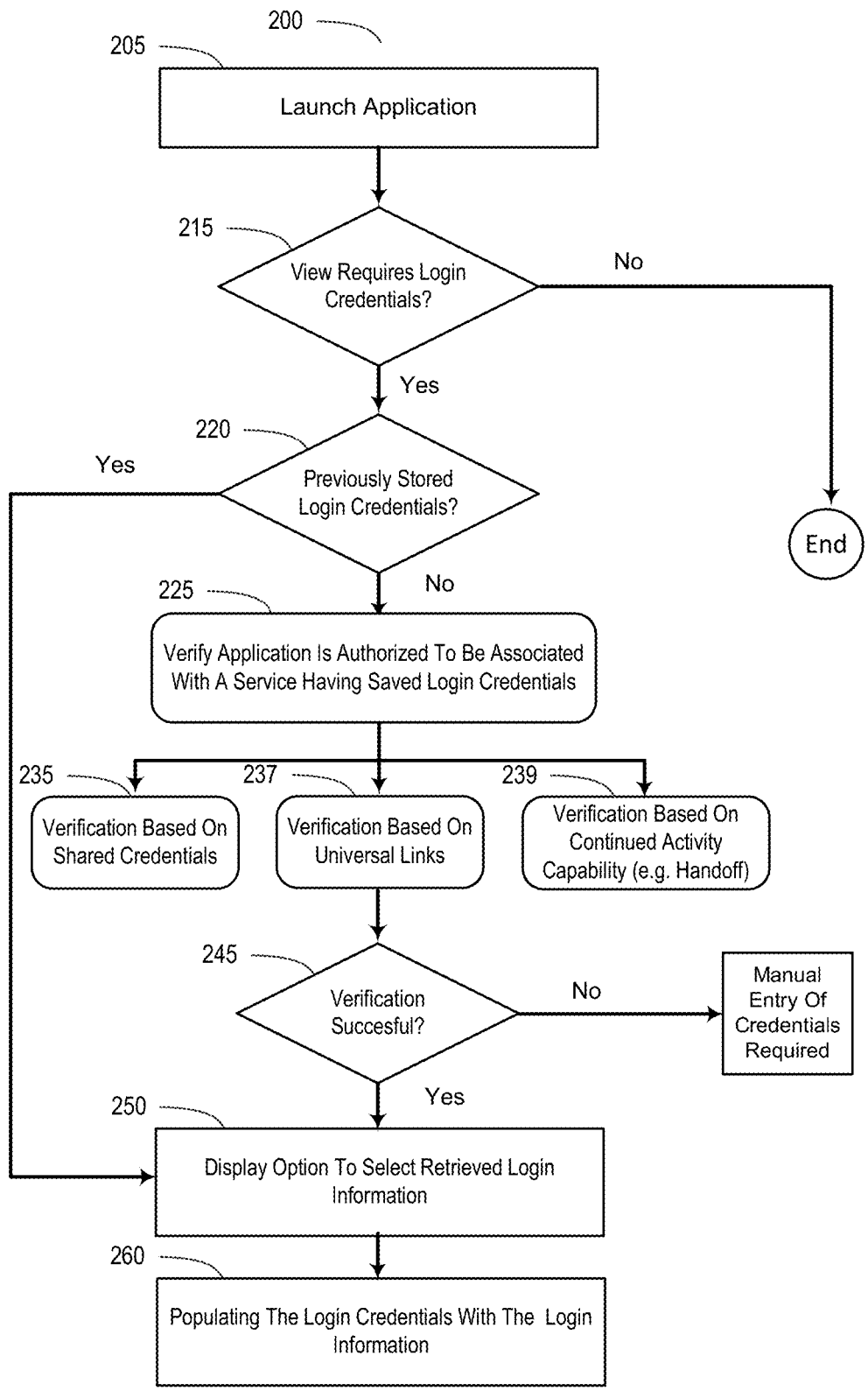
FIG. 2 is an example flow chart of a process for automatically populating login credentials for an application according to some embodiments.

FIG. 2 is an example flow diagram of a process for automatically populating login credentials for an application according to an embodiment of the disclosure. Process 200 may use processing logic, which may include software, hardware, or a combination thereof. For example, process 200 may be performed by a system (e.g. client device 109).

In 205, the system may launch (or open, or execute) an application such as third-party application. In one embodiment, a third-party application may refer to an application provided (e.g. via an application store) by an entity (e.g. manufacturer or company) other than the entity providing the operating system for the device, or the device itself. In some instances, an application may require login credentials (e.g. username and password) to access features of the application. In 215, the system may determine if a view (e.g. screen, page, etc.), of the application requires login credentials. As further described herein, the system may perform a determination, including a heuristic process, to determine the classification of one or more data entry fields within the view to determine whether the application requires login credentials. If the application does not require login credentials, the user may proceed to use the application and the auto-populate procedure is not required. If it is determined that the application does require login credentials, in 220, the system may determine if the application has previously stored login credentials. If so, in 250, the system may display an option to select the retrieved login information as further described herein. If it is determined that the application has not previously stored login credentials, in 225, the system may perform a verification process to determine if the application is authorized to be associated with the service that has saved login credentials that may be used for the application. In one embodiment, a service may include one or more components that are part of a platform (e.g. an application and/or related websites, APIs, etc.). For example, a service may include a website or related application that may be part of a platform (e.g. Facebook, Twitter, LinkedIn, etc.) that includes particular applications that may be installed on a device and are associated with corresponding websites. For instance, in one embodiment, a browser application may store saved login credentials for a particular website that is associated with the application. As another example, an application may attempt to retrieve login credential from a service such as a related application or other component that is associated with a particular application installed on a device. Accordingly, the application may attempt to retrieve and use such previously stored login credentials. However, in order to prevent unauthorized (or malicious) access to such login credentials, the system may validate an association between the application and the service.

The system may perform a verification process for an application using one or more methods, for example, verification methods 235, 237, and 239, as further discussed herein. In one embodiment, in 235, the system may perform a verification based on shared credentials. In one embodiment, an application may be verified based on a trust relationship. For example, the system may attempt to verify the trust relationship between an application and another application or service. For example, it may be possible for an application to declare an association in an unauthorized manner (e.g. inadvertently or maliciously), and thus, the system may guard against such a scenario by verifying the trust relationship is a two-way association (e.g. verify a cross-reference exists). In one embodiment, a two-way association may be verified based on confirming shared credentials. For example, the system may verify the ability for an application and a website to share web credentials.

Figure 3:
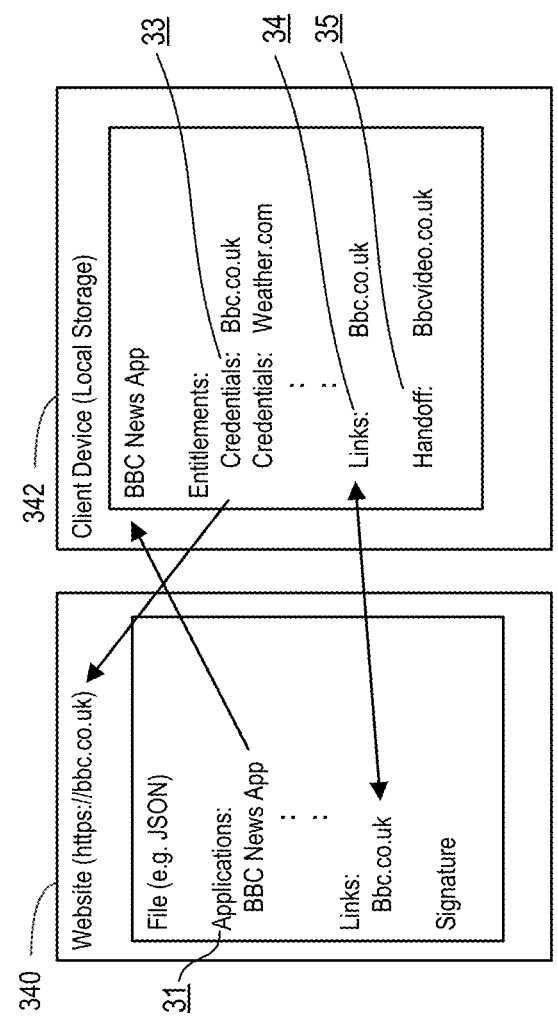
FIG. 3 is an example of lists used to determine associations between an application and service according some embodiments.

In one embodiment, the system may access one or more files for each of the application and a website, and verify that each references the other. In one embodiment, associations for an application may be determined according to a set of predefined entitlements. For example, a particular application may be required to specify particular capabilities as part of a development framework (e.g. as a requirement for distribution via an application store). For example, a platform may implement an underlying security model to protect an application from authorized modification and distribution. Accordingly, the framework may require an application to specify capabilities, which may be signed and authenticated. In one embodiment, the capabilities may include entitlements as well as other properties that may be stored, for example, in an information property list file. In one embodiment, an entitlement may be a right granted to an application that provides information related to allowing the application to access certain resources (e.g. extend beyond sandboxed capabilities) or to perform certain operations. In one embodiment, the application may specify websites to which its credentials may be shared. Accordingly, in one embodiment, a list of entitlements for the application may include a list of domains for which the application's credentials may be shared. For example, as shown in FIG. 3, a list 342 stored on a client device (e.g. in local storage) includes a list of entitlements for the BBC News APP. As shown, the entitlements may include a list of domains 33, which in this example include bbc.co.uk and weather.com.

Correspondingly, in order to determine associations for the service (e.g. website), the system may access a file associated with the service. In one embodiment, the system (e.g. client device 109) may access a file that is associated with the service and stored remotely from the client device on which the list 342 of entitlements for the application is stored. For example, in one embodiment, a file (e.g. JSON, or JavaScript Object Notation) may be stored on a website (e.g. server). The file may include a list of applications (or application IDs) that are authorized to be associated with the website. For example, as shown in FIG. 3, a list 340 stored on a website includes a list of applications 31 including the BBC News App. In one embodiment, a framework that provides the ability to share credentials may require that the associations remain secure. For example, the framework may require obtaining a signing certificate (e.g. code signing certificate) for the file (e.g. credentials file). For example, the framework may require the certificate to be issued by a certificate authority (CA). Accordingly, the file (e.g. JSON file) may be authenticated as coming from a particular domain. In one embodiment, the file may also include a time-to-live parameter, which specifies how long the file is authorized to be valid. In addition, as shown, a signature, which may be added or appended to the file, may be used by a client device to validate the authenticity of the file or the contents of the file. Accordingly, a list of associations may be verified as being authentic and authorized by the domain from which it is accessed (or downloaded) using a certificate or signature as described above. Accordingly, the system may verify the application by cross-referencing lists 340 and 342 as further described herein.

Returning to FIG. 2, in one embodiment, the system may perform a verification based on universal links in 237. A universal link as referred to herein can provide a secure way for allowing a selection of a link in a first application to result in the display of the content from the link in a different, second application. In one embodiment, this may be referred to as a website to application (or app) association. For example, a user may search, using a browser application, for a restaurant in a Yelp webpage (on Yelp's website) and tap or click on a Yelp restaurant listing and instead of displaying the content of that restaurant listing in the browser, the content is displayed within the Yelp app that is also installed on the client device.

For example, further non-limiting features of providing universal links may be found in commonly assigned U.S. patent application Ser. No. 14/732,612, titled "Associating a URL or Link Between Two Applications," filed Jun. 5, 2015, the entirety of which is incorporated herein by reference.

In one embodiment, support for universal links may be identified through a list of entitlements as described above. For example, referring once again to FIG. 3, a list 342 stored on a client device (e.g. in local storage) includes a list of entitlements for the BBC News APP, which may include a list of links 34 that specify a URL. It should be noted that various entitlements shown in this example are included in a single file, but it is contemplated that multiple files may be used (e.g. for each type of verification process).

To determine universal link associations for the service (e.g. website), the system may access a file associated with the service. For example, as described above, in one embodiment, a file (e.g. JSON) may be stored on a website and may include a list of applications (or application IDs) that are authorized to be associated with the website. As described above in FIG. 3, the list of associated applications 31 includes the BBC News App. Accordingly, in one embodiment, a list of entitlements and a list of applications associated with a website may also be used to establish a two-way association within the context of universal links.

Returning once again to FIG. 2, in one embodiment, in 239, the system may perform a verification based on a continued activity capability (or handoff capability). As referred to herein, in one embodiment, the continued activity capability may include the ability to commence (or start) an activity on a first device, and continue that activity on a second device. For example, the continued activity may include writing an email on a first device (e.g. desktop computer), and then continuing to write the email on a second device (e.g. smartphone). As another example, the continued activity may include performing an activity within a browser or web-based interface on a first device, and then continuing that activity using an application (e.g. native application) on a second device. For example, the user may view a video from a website or web-based interface on a first device, and then continue watching the video in an application (e.g. native application media player) on a second device, or vice versa. As referred to herein, the native application may include an application that has been developed for use on a particular platform (or OS) or device.

In one embodiment, the system may infer an authorized association by determining a capability of an application-to-web-based interface handoff, or a web-based interface-to-application handoff. For example, for an application-to-web-based interface, the application may create a particular object (e.g. activity object) and set a particular URL property. Accordingly, in one embodiment, the system may infer information from the object (e.g. URL property) as to whether an association between a website and a particular application is present. In another embodiment, support of a continued activity capability may also be reflected in the list of entitlements described above. For example, for a web-based interface-to-application handoff, a particular application may be required to subscribe to such a feature. Accordingly, the application may include a domain from which the application may receive handoffs in an entitlements list. In a similar manner as described above, a website attempting to provide a handoff may also include a corresponding file (e.g. JSON) file as described above. For example, referring once again to FIG. 3, list 342 that includes a list of entitlements for the BBC News APP, may include a domain from which handoffs may be received, which in this case is bbcvideo-.co.uk. Accordingly, based on associations related to a handoff feature, the system may determine authorized associations.

Based on various types of entitlements and associations described above, a two-way association between a service and an application may be verified.

Figure 4:
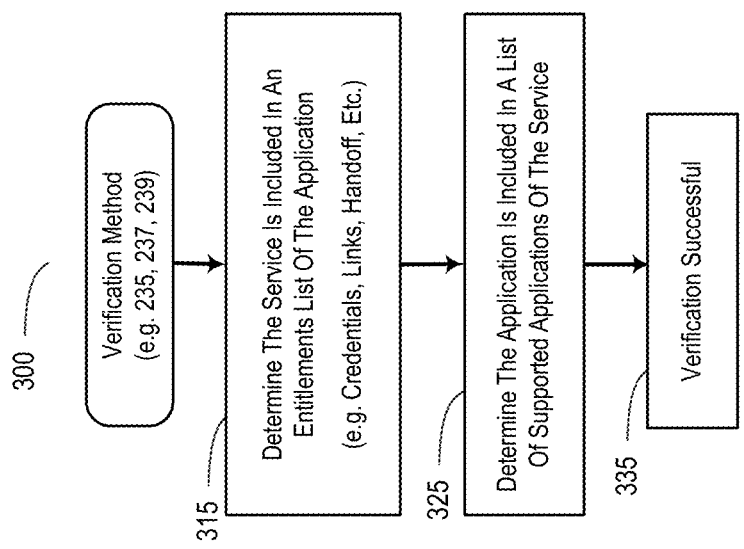
FIG. 4 is an example flow diagram of performing a verification of an application according to some embodiment.

FIG. 4 is an example flow diagram of performing a verification of an application according to an embodiment of the disclosure. Process 300 may be performed by a system (e.g. client device 109). In some embodiments, each of the two-way associations may be verified using process 300. For example, in 315, the system may determine whether a first service is included in an entitlements list of the application (e.g. list 342), and, in 325, the system may determine whether the application is included in a list of supported applications of the first service (e.g. list 340). If the system can verify the two-way association (as shown in FIG. 3), the system may deem the verification successful in 335.

It should be noted that the above verification processes, in some embodiments, may be performed prior to attempting to retrieve login credentials (e.g. prior to operation 205 or 215). For example, in one embodiment, the system may perform a validation process by a trusted system or service at installation time (or first runtime) of an application. Accordingly, in one embodiment, applications and websites can rely on the trusted system or service (which is distinct from the application) to perform secure validation. In one embodiment, after the one or more files have been validated, the contents of the file may be parsed to extract the associations. These associations may then be stored in a data structure, which may be accessed for the verification processes as described above. In one embodiment, the system may create a list of applications that support one or more of shared credentials, universal links, and continued activity. For example, the corresponding domains may be verified from retrieved files (e.g. JSON) and the information may be stored in such a list. Accordingly, the list may be a source of verified two-way associations, which may be parsed when required. In addition, applications (and domains) may be added to the list as necessary (e.g. upon installation of a new application) using the authentication methods described herein.

Returning to one again to FIG. 2, in 245, if the verification of an application was not successful, the system may proceed to require the user to manually enter credentials. If the verification was successful, and 250, the system may display an option to select the retrieved login information. In one embodiment, the retrieved login information may be retrieved from a keychain. For example, a user may have previously logged into a website using a browser by entering a user name and password, and saved those credentials to the keychain. In 260, the system may populate login credentials with the retrieved information in a secure manner as further discussed herein. Accordingly, upon completion of the verification process described above, the system may grant access to such login credentials.

Figure 5:
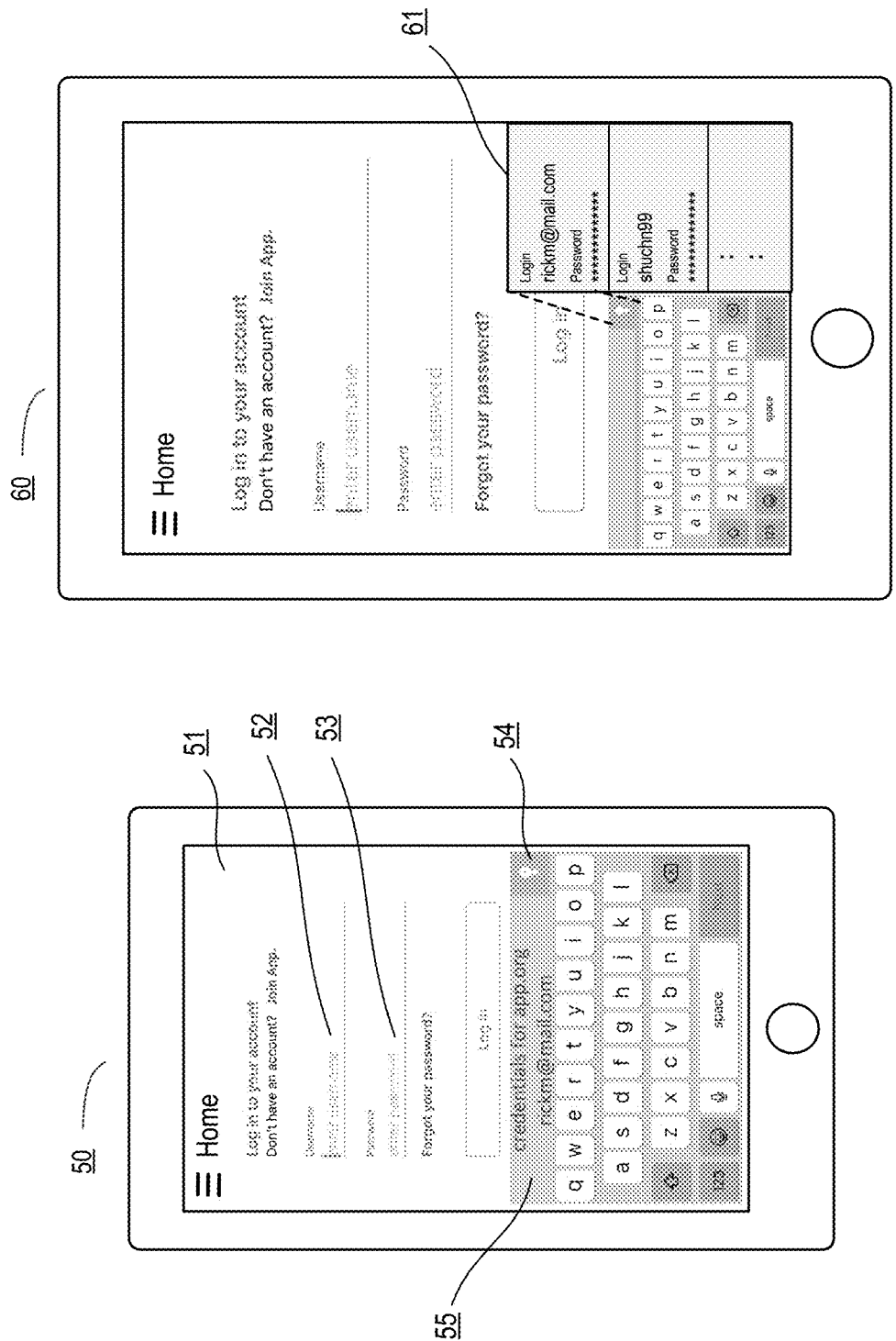
FIG. 5 is an example diagram of an interface that populates login credentials according to some embodiments.

FIG. 5 is an example diagram of interfaces that provides an option to select retrieved login credentials. As shown, in diagram 50, a view 51 may be displayed by an application (e.g. App. application as shown). The view may include one or more data entry fields. For example, the view may include a data entry field corresponding to a username 52 and/or data entry field corresponding to a password 53. In one embodiment, as shown, the interface may provide a candidate login credential 55. In one embodiment, the candidate credential may include a reference to the associated website (e.g. app.org). In addition, the candidate login credential may reference, for example, the user name of the suggested credential. As shown, the interface may include an icon 54. In one embodiment, the icon 54 may be selected to reveal all saved passwords, even in instances where a candidate login credential was not verified. In addition, as shown in diagram 60, the system may display a list of candidate login credentials 61 that may (or may not) have been verified using the methods described above. In one embodiment, in order to present candidate login credentials 55 in a secure manner, the system may use a secure image.

Figure 6:
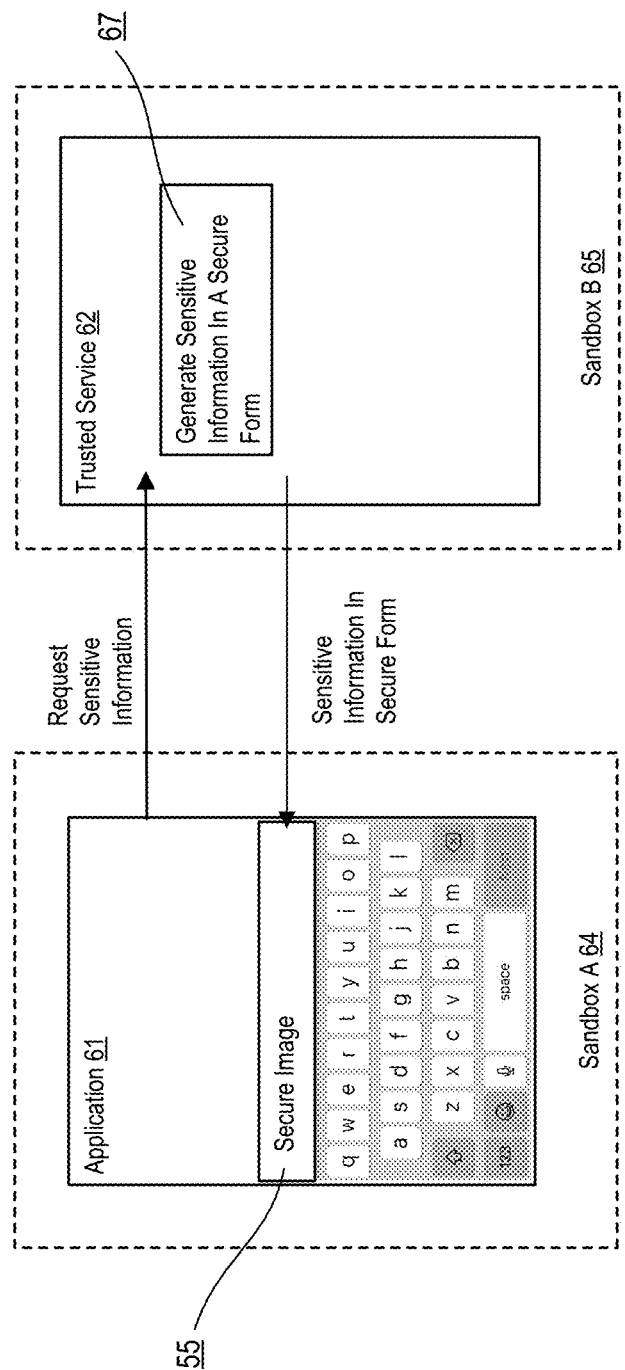
FIG. 6 is an example diagram illustrating an example interaction between an application and a trusted system/service to obtain a secure image of a candidate login credential according to some embodiments.

FIG. 6 is an example diagram illustrating an example interaction with a trusted service 62 (or system) for obtaining a secure image 55 of a candidate login credential. As described above, an application 61 may retrieve login credentials. In one embodiment, the system may implement additional security measures to ensure that an application is not aware of content of potential candidate login credentials until a user confirms selection of a credential. For example, as part of the retrieval process, the application may request sensitive information (e.g. credentials) from a trusted service 62. Accordingly, the trusted service 62 may generate sensitive information in a secure form 67, which may then be provided to the application 61. For example, in the context of credentials, the trusted service 62 may generate (or render) a secure image 55 that may include information associated with the login credential (e.g. username). The secure image 55 may prevent the application (or other applications) from capturing the data displayed within the image. For example, a software screenshot or other software function would be rendered incapable of capturing the secure image 55.

As shown, the application 61 and trusted service 62 may each execute in separate sandboxes 64 and 65, respectively. In one embodiment, sandboxes 64 and 65 may each compartmentalize resources (e.g. data, memory addresses, processes, features, etc.) such that neither the application 61 nor the service 62 may access resources outside of their respective sandbox. In one embodiment, the trusted service 62 is controlled by a kernel of an operating system such that the trusted service 62 and the application 61 are scheduled separately by a scheduler of the kernel and are maintained in separate memory spaces or separate sandboxes as described above.

Figure 7:
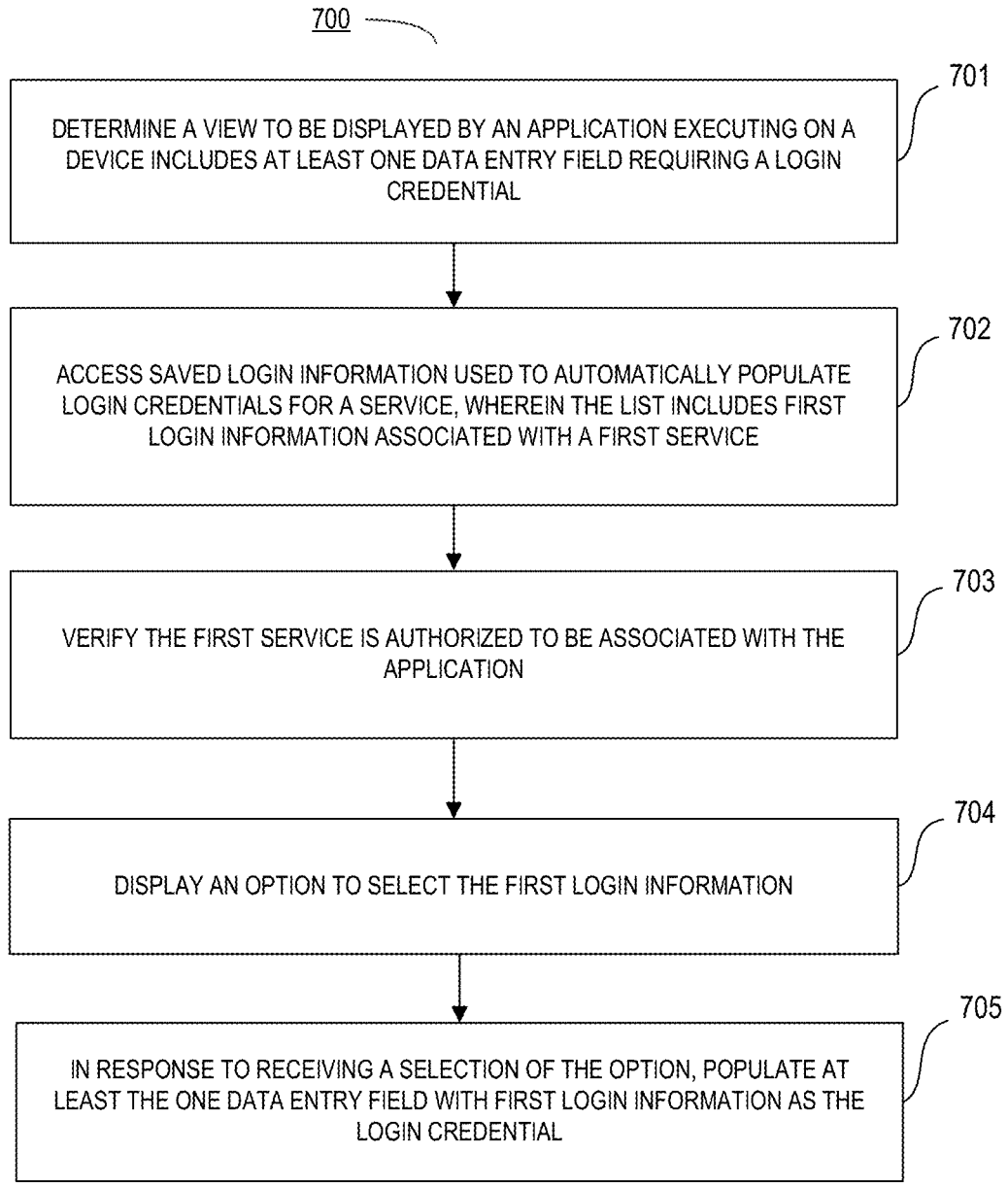
FIG. 7 is an example diagram illustrating a method of populating login credentials for an application according to some embodiments.

FIG. 7 is an example diagram illustrating a method of populating login credentials for an application according to an embodiment of the disclosure. Process 700 may use processing logic, which may include software, hardware, or a combination thereof. For example, process 700 may be performed by a system (e.g. client device 109).

In 701, the system may determine a view (e.g. view 51 as shown in FIG. 5) to be displayed by an application executing on the system includes at least one data entry field (e.g. fields 52 or 53) requiring a login credential.

In one embodiment, determining whether a view requires a login credential may include performing one or more heuristics to determine characteristics of the displayed page. For example, the characteristics may include determining whether a data entry field corresponds to a username or password field. The characteristics may also include determining the number of data entry fields. For example, determining the presence of two entry fields within proximity of each other may provide an indication of a username and password pair of data entry fields. In addition, various characteristics of a data entry field may also be considered such as whether the entry of the text is secured, which may provide an indication of the presence of a password field. Other characteristics of the fields themselves may also be considered such as whether or not the fields are transparent or visible. As another example, the characteristics of the fields may include the size, height, focus settings, etc.

In 702, the system, may access saved login information that is used to automatically populate login credentials for a service such as website. For example, the saved information may include first login information associated with a first web site.

In 703, the system may verify a first service is authorized to be associated with the application executing on the system. As described above, the application may be verified in one or more ways. For example, the application may be verified based on confirming shared credentials (e.g. web credentials) with the first service. Accordingly, verifying the application is authorized to be associated with the first service may include determining the first service is included in an entitlements list of the application, and determining the application is included in a supported applications list of the first service. In one embodiment, the entitlements list of the application may be accessed from a file stored on the device and associated with the application. In one embodiment, the supported applications list of the first service may be accessed from a file stored on a website associated with the first service. In addition, the supported applications list may include a reference indicating the application is an authorized application for an entity that controls or operates the first service.

In one embodiment, the supported applications list may be stored within a JSON or similar type file (e.g. object file) as described above. In one embodiment, the file may include a signature. The signature may be a cryptographic signature to allow the JSON file to be validated as authentic from and authorized by the domain from which it was downloaded or accessed. Accordingly, the system may allow a domain to control which apps can be associated with the website. For example, when the installer software or operating system software of a client device use a signed JSON file to create associations owned and authorized by a website, it is possible for the website to control which applications or apps can be associated with the website.

In addition, a service may be verified based on determining the service is authorized to provide a universal or a deep link with the application. Accordingly, verifying the service is authorized to be associated with the application may include accessing a list of applications that support universal links and determining if the list includes a first URL associated with a first application. Accordingly, the system may determine whether the first URL includes a domain associated with the first service and determine whether the first application matches the application executing on the device. As described above, support for a universal link allows the application executing on the device to open, within the application, content of the first URL displayed in a different application.

In addition, a service may be verified based on determining the service is authorized to provide a continued activity capability (or handoff). Accordingly, verifying the service is authorized to be associated with the application may include accessing a list of applications that support a continued activity feature and determining the list includes a first activity associated with a first application. Accordingly, the system may determine the first activity is associated with the first service, and determine the first application matches the application executing on the device. As described above, support for the continued activity capability allows the application executing on the device to resume an activity, within the application, that was commenced on a different device.

In 704, the system may display an option to select the first login information. In one embodiment, and as shown in diagram 50 of FIG. 5, the system may display only the first login information along with a reference to the first website. For example, as shown, the interface provides an indication that the candidate login credential 55 is associated with the app.org website. In one embodiment, and as shown in diagram 60 of FIG. 5, the system may display the first login information amongst a list of login information candidates 61.

In 705, the system, in response to receiving a selection of the option, may populate at least the one data entry field with first login information as the login credential. In one embodiment, the at least one data entry field may include a first and second data entry field, as shown in FIG. 5, and the first login information may include a username 52 for the first data entry field and a password 53 for the second data entry field.

Accordingly, the disclosure provides a convenient and safe mechanism to retrieve applicable login credentials to enhance a user experience.

It should be noted that there may be variations to the flow diagrams or the steps (or operations) described therein without departing from the embodiments described herein. For instance, the steps may be performed in parallel, simultaneously, a differing order, or steps may be added, deleted, or modified.

Figure 8:
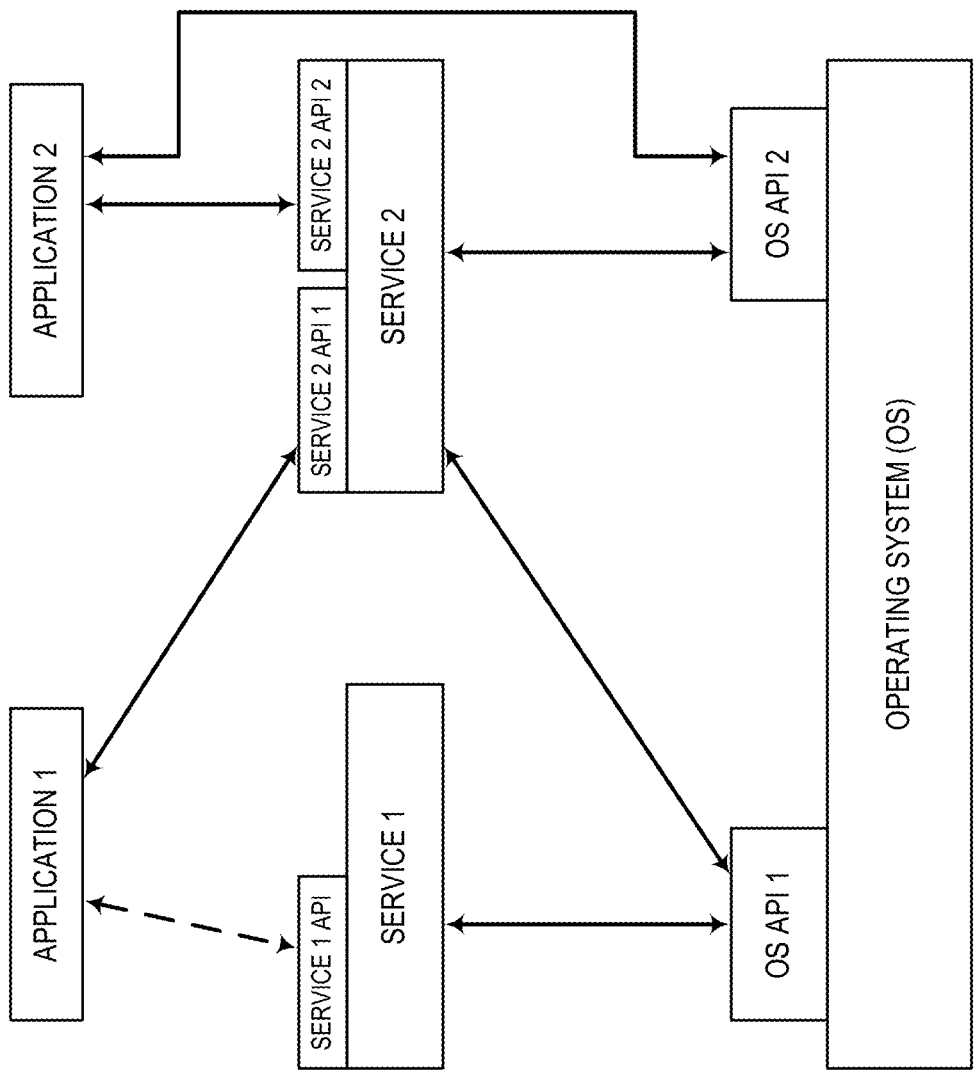
FIG. 8 is an example software stack that may be used in some embodiments.

FIG. 8 is an example software stack that may be used in some embodiments of the disclosure. For example, the software stack may allow an application to subscribe to one or more features as described above (e.g. shared credentials, universal links, handoff, etc.). As shown, applications can make calls to Services 1 or 2 using several Service APIs and to Operating System (OS) using several OS APIs. Services 1 and 2 can make calls to OS using several OS APIs. Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Multiple Device Credential Sharing

In some instances, a user may be interacting with a first computing device attempting to authenticate the user but has one or more potentially relevant authentication credentials stored on a second computing device. As will be described in greater detail below in various embodiments, the first computing device can send a request to the second device asking it to supply a credential associated with a user authentication. The first computing may also provide information (e.g., as an application identifier, a domain name, etc.) usable by the second computing device to identify a relevant user credential stored in the second computing device. In various embodiments, this information may be verified by the first computing device using the techniques discussed above with respect to FIGS. 1-8 before the information is conveyed to the second device in order to prevent, for example, a spoofing attack in which the user of the second device is deceived into supplying a credential. In response to receiving the request from the first device, the second device may determine, based on the provided information, whether it stores any user credentials that are relevant to the authentication. The second device may then present a selection prompt asking a user of the second computing device to select a stored user credential to provide to the first computing device for authentication and may further identify the relevant user credential in the selection prompt.

Figure 9:
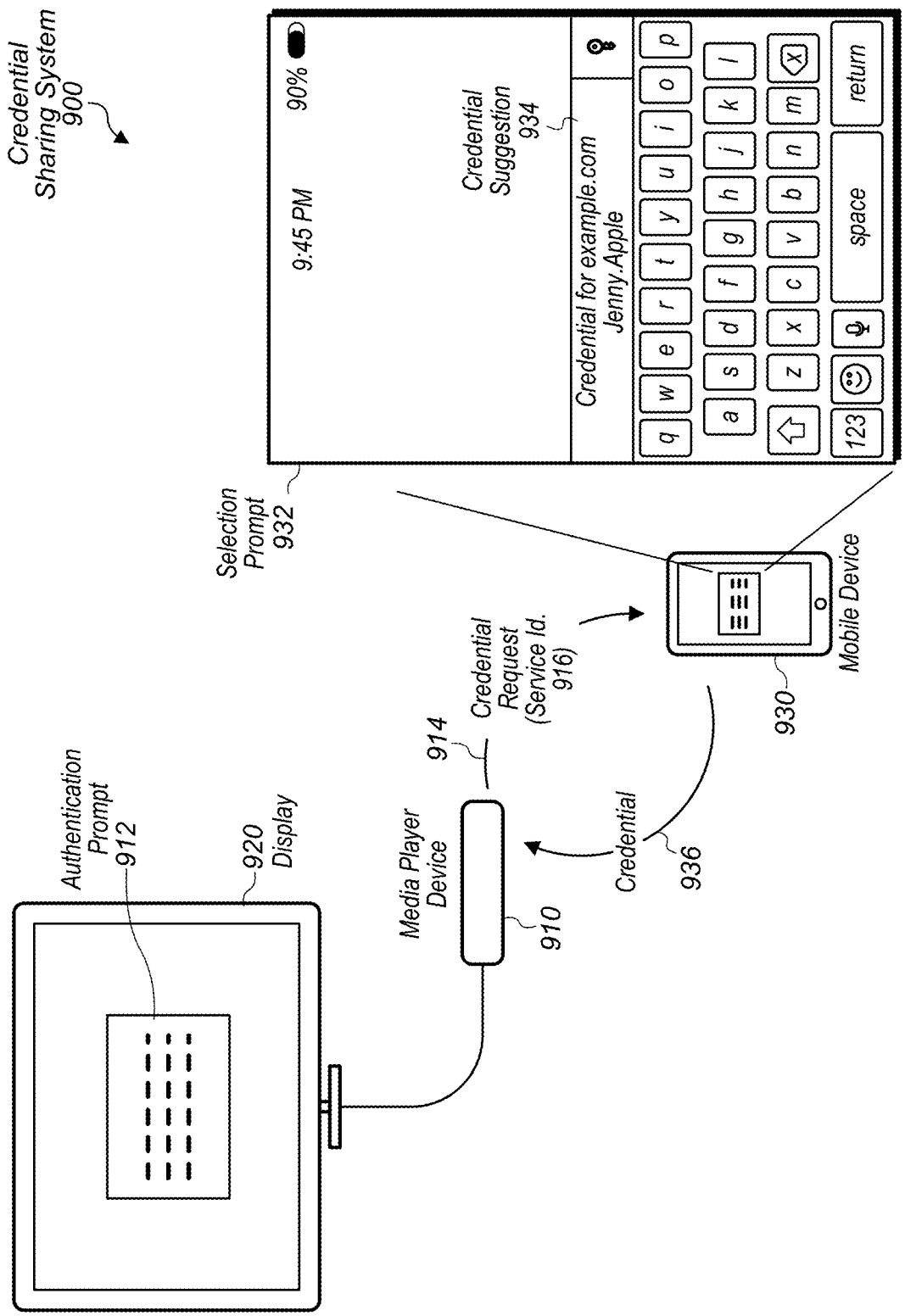
FIG. 9 is a block diagram illustrating an example of a multi-device system for sharing credentials according to some embodiments.

Turning now to FIG. 9, a block diagram of a credential sharing system 900 is depicted. In the illustrated embodiment, system 900 includes a media player device 910 coupled to a display 920, and a mobile device 930. In some embodiments, system 900 may be implemented differently than shown—e.g., display 920 may be integrated into device 910, mobile device 930 may be one of a plurality of devices 930, etc.

Media player device 910, in various embodiments, is a device configured to present content on a display 920. In the illustrated embodiment, this content may include various media played on display 920, which may be a television in some embodiments. In some embodiments, media player device 910 includes a wireless interface configure to communicate with a wireless remote controller, which may receive various input from and provide indications of the inputs to device 910 to control operation of device 910. The remote controller may support any of various wireless protocols such as infrared (IR), Bluetooth™ Wi-Fi™, etc. Although a media player device is given as one example, device 910 may correspond to any suitable computing device such as laptop or notebook computer, personal computer system, desktop computer, a server system, mainframe computer system, tablet computer, handheld computer, workstation, network computer, a mobile phone, music player, personal data assistant (PDA), wearable device, internet of things (IoT) device, etc.

In some instances, media player device 910 may present an authentication prompt 912 on display 920 soliciting a credential 936 for authenticating a user. In some embodiments, this prompt 912 is provided by an application executing on device and provided to authenticate with respect to a service as discussed above. This service may pertain to, for example, accessing content maintained by an application, enabling functionality of an application, logging into an application, etc. This service may also pertain to accessing information located externally from media player device 910. For example, prompt 912 may be presented by an application associated with a streaming service and executable to stream various video content to media player device 910. In some embodiments, prompt 912 is presented by a web browser executable to render webpages on display 920—thus, authentication prompt 912 may correspond to an authentication page for a web site. In other embodiments, however, device 910 may not present any prompt when soliciting a credential 936—e.g., device 910 may not have a display, device 910 may determine to forgo presenting a prompt 912 if a mobile device 930 with a relevant credential can be identified, etc.

Mobile device 930, in various embodiments, is configured to maintain various credentials 936, which may be relevant to authentication prompt 912. These credentials 936 may include any suitable type of credential such as a username and password, one-time password (OTP), personal identification number (PIN), a digital signature generated by a cryptographic key, authentication token, etc. Although described as a mobile device 930, device 930 may correspond to any suitable device such as those noted above with respect to media player device 910. As shown in FIG. 9, mobile device 930 may receive a credential request 914 and present a corresponding selection prompt 932 for selecting a credential 936 to provide to media player device 910.

In various embodiments, media player device 910 sends a credential request 914 in responsive to a user providing some input to device 910 such as via a remote controller of device 910. For example, a user may navigate one or more menus depicted on display 920 resulting in the presentation of authentication prompt 912, and request 914 may be sent in response to the user selecting a field in authentication prompt 912. In some embodiments, request 914 may be sent as a broadcast (i.e., a communication not directed to any device in particular) and may be generic advertisement for a credential 936 as information about the specific desired credential 936 may be conveyed later once a secure connection is established with a device responding to request 914. In other embodiments, however, request 914 may be directed to one or more specific devices 930.

In various embodiments, media player device 910 also sends information (shown as a service identifier 916 in the illustrated embodiment) usable by mobile device 930 to identify a user credential 936 stored in mobile device 930, which may be relevant to request 914. For example, if a prompt 912 is being presented to authenticate for a service associated with a website, the service identifier 916 may identify the particular website by specifying, for example, a domain, a uniform resource locator (URL), internet protocol (IP) address, etc. If prompt 912 is being presented to authenticate for a service provided by an application executing on media player device 910, the service identifier 916 may identify the particular application by specifying, for example, the name of the application, the name of application's executable file, the directory path to the executable file, etc. In some embodiments, this information may originate from an application (e.g., as list 342) executing on device 910 and/or may be included in request 914. In other embodiments discussed below with respect to FIG. 10, this information conveyed separately from request 914. In various embodiments, media player device 910 may further verify this information using the various techniques discussed above with respect to FIGS. 1-8 prior to presenting this information to mobile device 930. Accordingly, in some embodiments, if authentication prompt 912 is provided by an application executing on media player device 910 and purporting to be associated with a service provided by a website, media player device 910 may verify that the application is authorized to receive a user credential 936 used to authenticate to the website (e.g., by retrieving, from the website, list 340 discussed above to confirm that the application is associated with the service) before specifying a domain name of the website in the information sent to mobile device 930.

In response to receiving a request 914, device 930 may present one or more prompts to a user such as a selection prompt 932. In various embodiments, selection prompt 932 presents one or more credentials 936 stored on mobile device 930 and allows a user to select one of the credentials 936 to provide it to media player device 910. As shown in FIG. 9, selection prompt 932 may provide a credential suggestion 934 in which prompt 932 identifies a credential 936 determined to be relevant to authentication prompt 912, which be identified based on the information provided by device 910. As also shown, selection prompt 932 may also include a keyboard presented on a display of mobile device 930 and operable to provide a user input to media player device 910. Accordingly, if the user does not want to use the suggested credential, the use may manually input one via the displayed keyboard. Alternatively, the user may bring up a more extensive list of stored credentials (e.g., by selecting the button with a key icon depicted in FIG. 9) as will be discussed below with respect to FIG. 11C. In some embodiments, selection prompt 932 is presented by an operating system of mobile device 130, which may be executable to implement various functionality described herein with respect mobile device 930. In other embodiments, selection prompt 932 is presented by an application other than an operating system. For example, in one embodiment, functionality described herein with respect to mobile device 130 may be performed by a remote control application for media player device 910 that is executable by mobile device 930 to remotely control operation of media player device 910.

In some embodiments, mobile device 930 may provide additional prompts such as a device authentication prompt asking the user to supply an input usable to authenticate mobile device 930 to media player device 910. For example, in one embodiment, the prompt may ask a user to enter code depicted on display 920; however, other techniques may be used as discussed below with respect to FIG. 11B. In some embodiments, mobile device 930 also performs a local authentication of the user before permitting a credential 936 to be provided media player device 910. Such an authentication may include verifying biometric (e.g., fingerprint, facial data, etc.), a user's passcode, etc. Examples of various prompts that may be presented by mobile device 930 are discussed in further detail below with respect to FIGS. 11A-11D.

After a user has selected a credential 936 from selection prompt 932, mobile device 930 may provide the credential 936 to media player device 910 as shown in FIG. 9. In various embodiments, in response to receiving credential 936, media player device 910 may automatically populate one or more fields in the authentication prompt 912 with the credential 936. In some embodiments, media player device 910 may further automatically submit content of the populated one or more fields in response to receiving credential 936. In other embodiments, however, a user may be required to select a button to submit a credential 936. An exemplary exchange between devices 910 and 930 is described in greater detail below with respect to FIG. 10.

Figure 10:
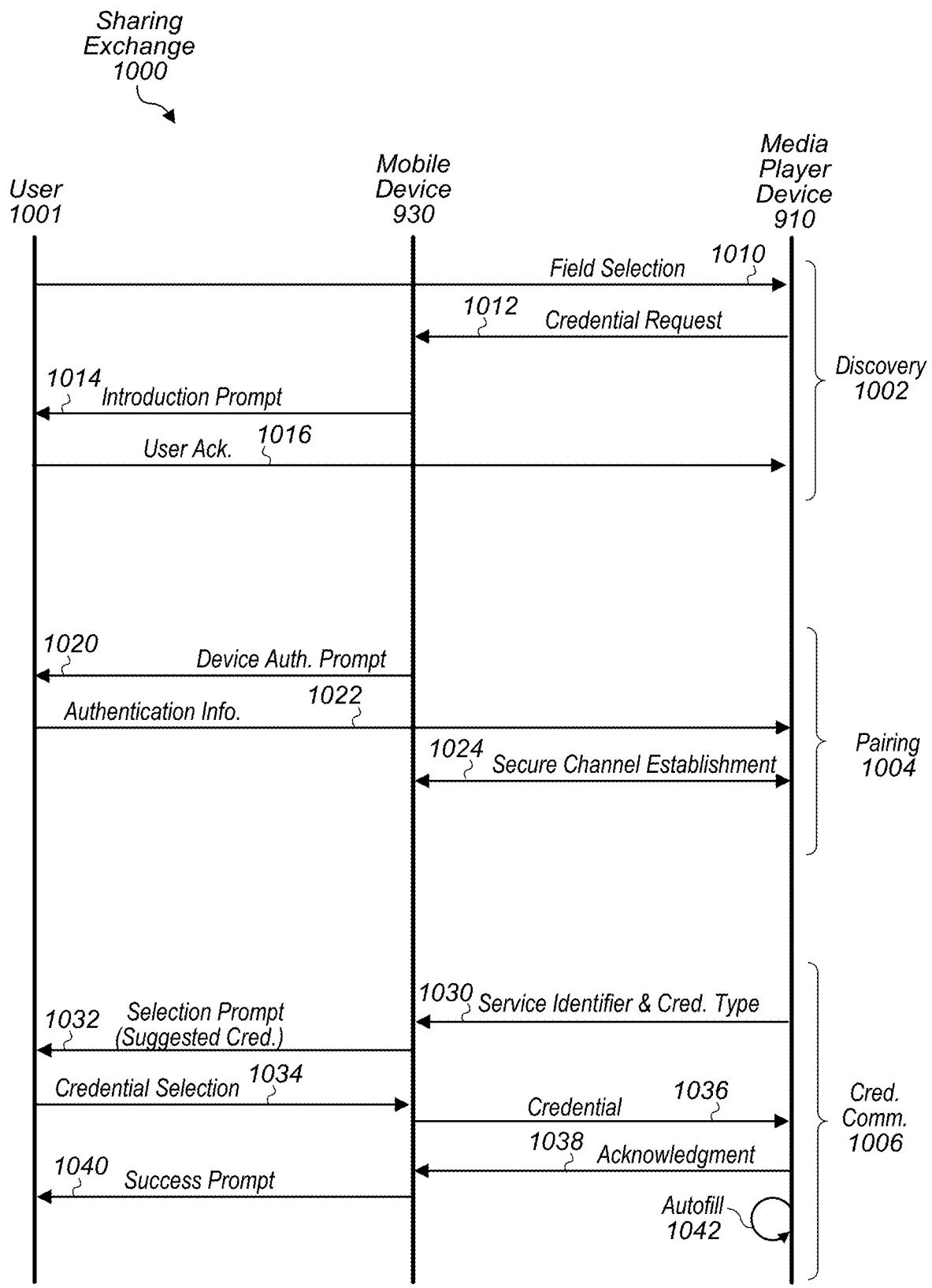
FIG. 10 is a communication diagram illustrating an example of an exchange between devices sharing credentials.

FIG. 10 depicts a communication diagram of an exchange 1000 for sharing a credential 936. In the illustrated embodiment, exchange 1000 includes a discovery phase 1002, pairing phase 1004, and credential communication phase 1006. In other embodiments, exchange 1000 may be implemented differently—e.g., steps may be performed in a different order, concurrently, or omitted.

Discovery phase 1002, in various embodiments, is the initial phase in which media player device 910 attempts to discover nearby devices, which may be interested in sharing a credential 936 with media player device 910. In the illustrated embodiment, phase 1002 begins at 1010 with a user providing an input to media player device 910 such as selecting a field in authentication prompt 912. As noted above, this input may be supplied by the user via a remote controller such as an infrared (IR) remote, Bluetooth® remote, keyboard, mouse, or any other suitable input device. In response to receiving an indication of this selection, media player device 910 sends a credential request 914, which is received by mobile device 930 at 1012. Mobile device 930 may then present an introduction prompt at 1014 (discussed below with respect to FIG. 11A) asking a user 1001 if he or she wants to share a credential 936. If the user indicates in the affirmative, an indication may be provided at 1016 by mobile device 930 to media player device 910. Exchange 1000 then proceeds to pairing phase 1004.

Pairing phase 1004, in various embodiments, is an intermediary phase in which devices 910 and 930 authenticate one another and establish a secure communication channel. In the illustrated embodiment, phase 1004 begins at 1020 with mobile device 930 presenting an device authentication prompt (discussed below with respect to FIG. 3B) asking user 1001 to input authentication information, which is conveyed to media player device 910 at 1022 in order to authenticate mobile device 930 and media player device 910. In some embodiments, media player device 910 presents a value on display 920, and the device authentication prompt asks user 1001 to input the value into the prompt; however, in other embodiments, other techniques may be used as discussed below. After confirming the authentication information, media player device 910 establishes a secure/encrypted channel with mobile device 930 at 1024 to protect subsequent communications between devices 910 and 930. In some embodiments, this may include performing a Diffie-Hellman (DH) key exchange to establish a cryptographic key for encrypting and decrypting subsequent communications. Exchange 1000 then proceeds to credential communication phase 1006.

Credential communication phase 1006, in various embodiments, is the last phase in which a selected credential 936 is communicated. In the illustrated embodiment, phase 1006 begins at 1030 with media player device 910 providing, via the secure channel, information about authentication prompt 912 such as a service identifier and a credential type. As discussed above, the service identifier, in various embodiments, indicates a particular service for which authentication prompt 912 is being presented. The credential type, in various embodiments, identifies the type of credential 936 being solicited by authentication prompt 912 such as a username and password, OTP, PIN, digital signature generated by a cryptographic key, authentication token, etc. At 1032, mobile device 930 presents a credential selection prompt 932 (discussed below with respect to FIG. 11C), which may include a suggested credential 936 determined to be relevant based on the information received at 1030. In some embodiments, mobile device 930 may further authenticate user 1001 by verifying a user's passcode, biometric, etc. before presenting the selection prompt 932. Once user 1002 has selected a credential 936 from the selection prompt 932 at 1034, mobile device 930 provides the selected credential 936 at 1036. In some embodiments, media player device 910 may send an acknowledgement at 1038 that the credential 936 was successful received and a corresponding success prompt (discussed below with respect to FIG. 11D) may be presented at 1040 to user 1001. At 1042, media player device 910 automatically fills one or more fields in authentication prompt 912 with the contents of the credential 936. In embodiments in which a prompt 112 is not presented, media player device 910 may convey the credential 144 to the application/service attempting to authenticate the user in some other manner.

Figure 11A:
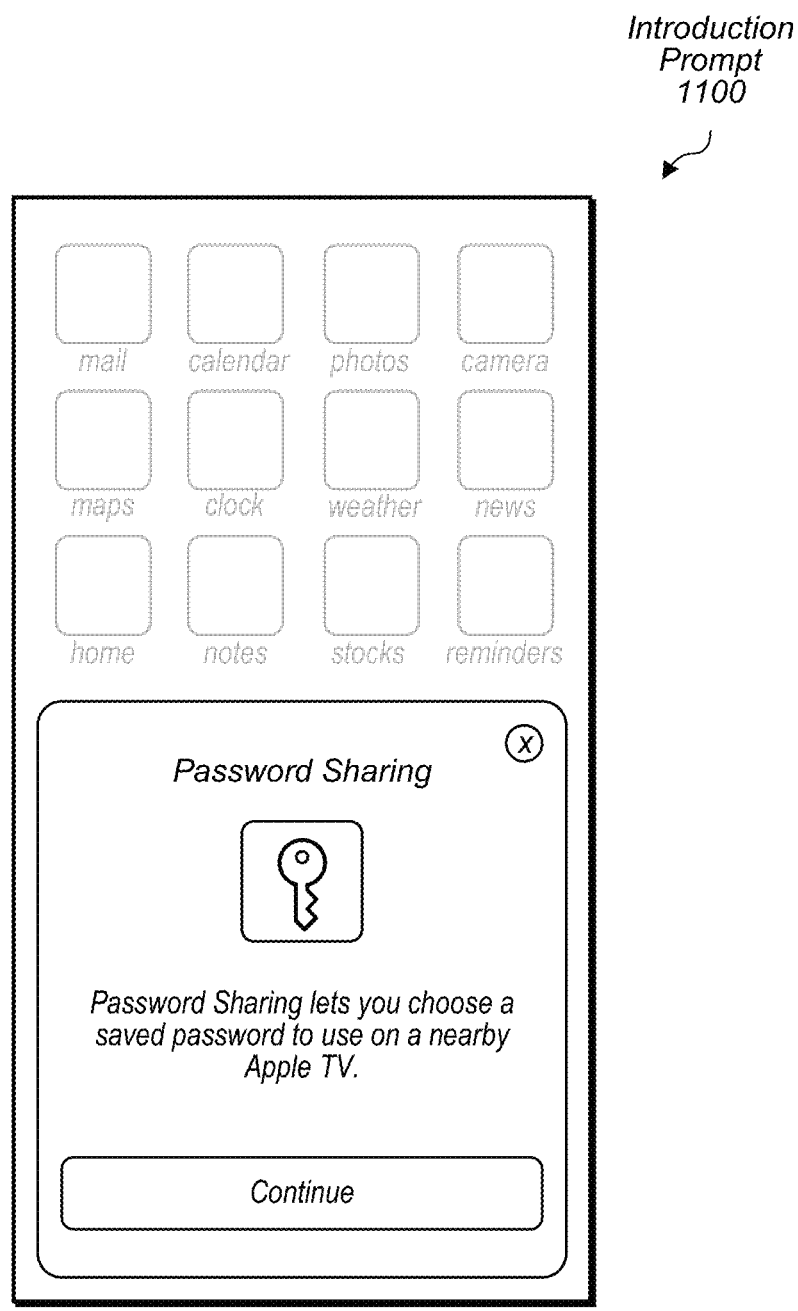
FIGS. 11A-D illustrate examples of prompts presented to a user sharing a credential between devices according to some embodiments.

FIG. 11A depicts a diagram of an introduction prompt 1100. As noted above, introduction prompt 1100 may be an initial prompt presented during discovery phase 1002 and used to confirm that a user is interested in sharing a credential 936. In the illustrated embodiment, prompt 1100 includes a "continue" button selectable by a user to indicate to the media player device 910 that he or she is interested in sharing a credential 936. Otherwise, a user can select the "X" button to dismiss the prompt 1100. In some embodiments, introduction prompt 1100 may be implemented different than shown (e.g., prompt 1100 may be a banner descending from the top of the screen) or not implemented.

Figure 11B:
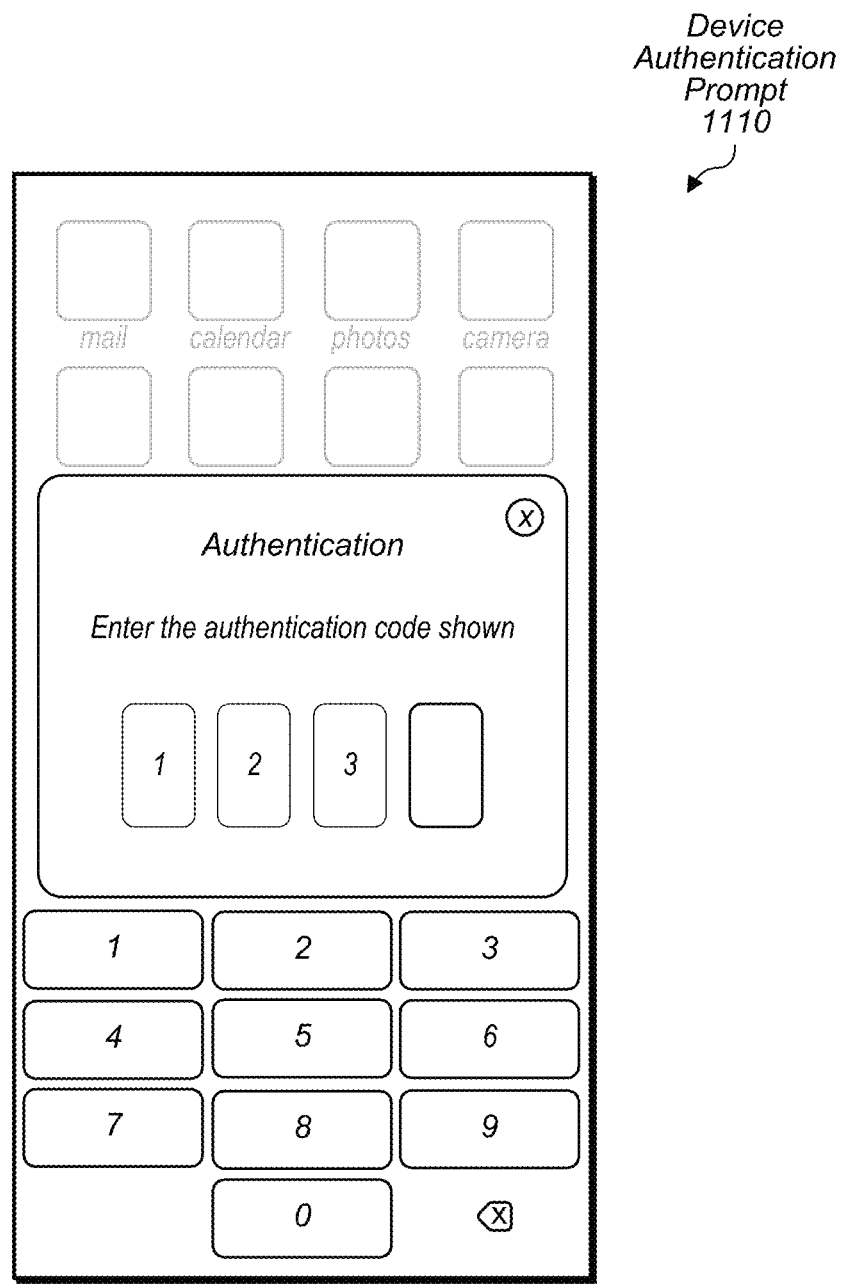

FIG. 11B depicts a diagram of a device authentication prompt 1110 is depicted. As noted above, device authentication prompt 1110 may be presented during pairing phase 1004 to authenticate mobile device 930 and media player device 910. In the illustrated embodiment, prompt 1110 asks the user to enter a four-digit value depicted on display 920 in order to authenticate devices 910 and 930. Such an authentication may be performed, for example, to prevent someone who not able to view display 920 from interfering with media player device 910. In some embodiments, authentication prompt 1110 is performed during each exchange 1000. In other embodiments, the authentication may be persisted across multiple exchanges 1000—e.g., mobile device 930 may receive a token from media player device 910 to use in lieu of prompt 1110.

In other embodiments, mobile device 930 and media player device 910 may authenticate differently than shown in FIG. 11B. For example, in some embodiments, media player device 910 may present a QR code, particle cloud, etc. on display 920, and prompt 1110 may instruct the user to capture it with a camera of mobile device 930. In some embodiments, media player device 910 may play a sound with a watermark, and mobile device 930 may capture the watermark via microphone of device 930 to authenticate with media player device 910. In some embodiments, device 910 and 930 may be authenticated based on both devices being registered with the same cloud-based user account. Accordingly, mobile device 930 may determine that devices 910 and 930 are registered to the same account of a cloud service and, based on the determination, exchange a shared secret between the first and second computing devices in order to communicate the selected user credential via an encrypted channel established based on the shared secret.

Figure 11C:
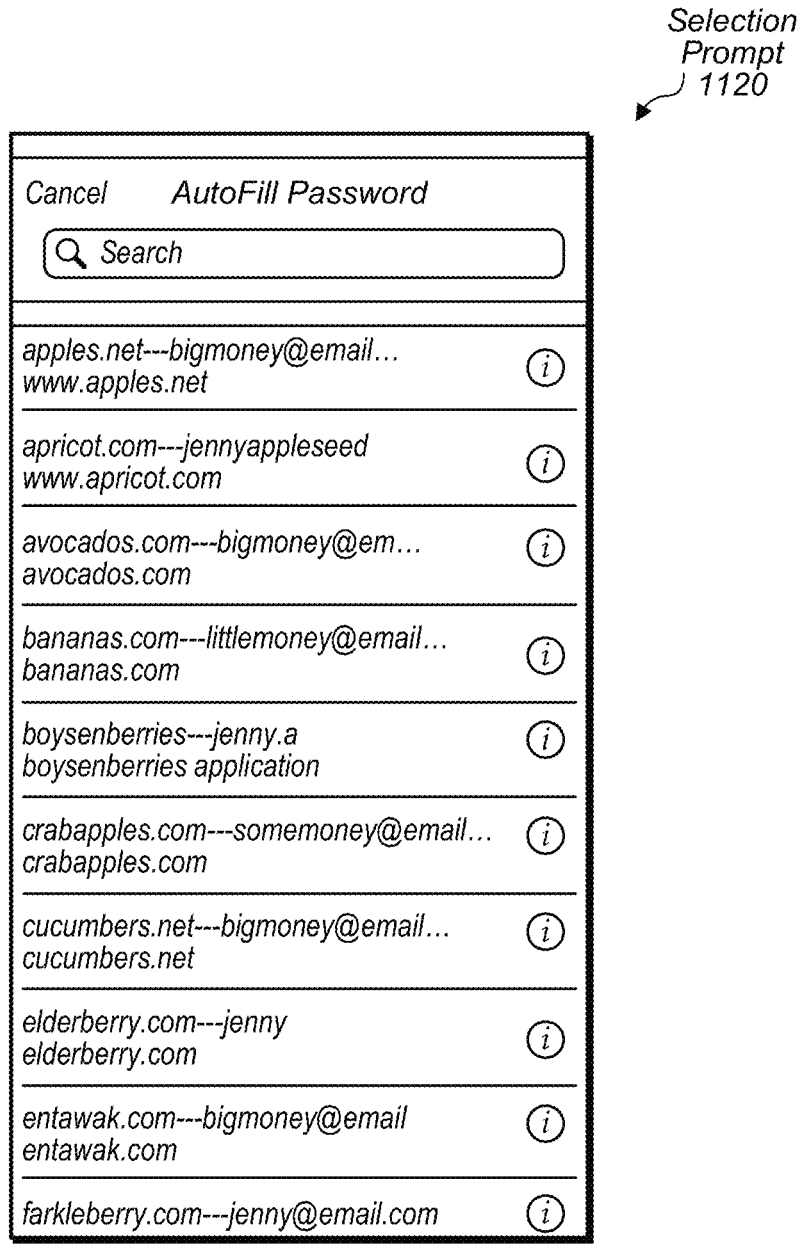

FIG. 11C depicts a diagram of a selection prompt 1120 is depicted. In some embodiments, selection prompt 1120 may be presented during credential selection phase 1006 if the user does not want to use the credential suggestion 934 and instead wants to select one of the other credentials stored in mobile device 930. In the illustrated embodiment, selection prompt 1120 presents a list of credentials 936 maintained by mobile device 930. Accordingly, selecting the credential for apricot.com, for example, may cause media player device 910 to receive the credential 936 and to populate the username field in prompt 912 of FIG. 9 with "jennyappleseed" and the password field with the corresponding password. If the depicted portion of the credential list does not include the desired credential, a user may scroll through the list or enter an input into the depicted search field to search for the desired credential. In the illustrated embodiment, selecting the 'i' icon may allow a user to view additional information about the credentials 936 such as the credential type, service identifier, etc.

Figure 11D:
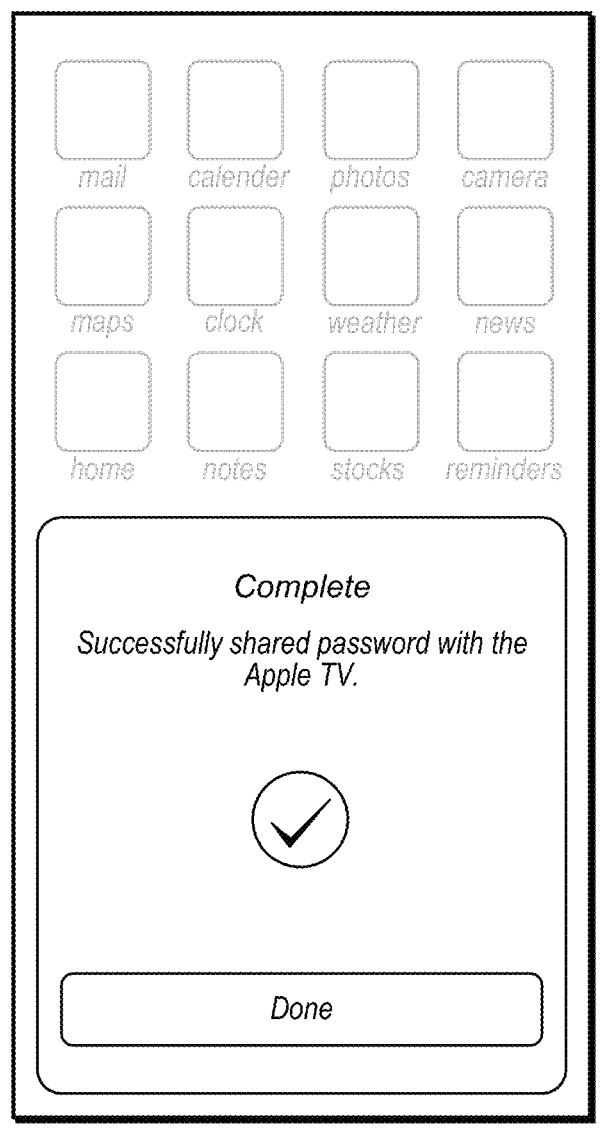

FIG. 11D depicts a diagram of a success prompt 1130 is depicted. As noted above, success prompt 1130 may be presented during credential selection phase 1006 on mobile device 930 in response to device 930 successfully sharing a credential 936 with media player device 910. In the illustrated embodiment, success prompt 1130 announces the success of the credential sharing and has a "Done" button to acknowledge the prompt. In some embodiments, however, success prompt 1130 may be implemented differently than shown—e.g., it may be banner dropping down from the top, may not have an acknowledgment button, etc. In still other embodiments, a success prompt 1130 may not be presented.

FIG. 12A depicts a flow diagram of a method 1200 for sharing a credential. In various embodiments, method 1200 is performed by a first computing device in possession of credential such as mobile device 930. In some embodiments, steps may be performed concurrently or in a different order than shown.

In step 1205, the first computing device stores a set of user credentials (e.g., user credentials 936) usable to authenticate a user of the first computing device.

In step 1210, the first computing device receives, from a second computing device (e.g., media player device 910), a request (e.g., credential request 914) for a user credential to be provided responsive to an authentication prompt (e.g., prompt 912) associated with the second computing device. In various embodiments, step 1210 further includes receiving an indication of a service (e.g., service identifier 916) for which the authentication prompt is being presented.

In step 1215, the first computing device determines, based on the indication, whether the stored set of user credentials includes a user credential relevant to the authentication prompt. In some embodiments, the indication includes information indicative of an application presenting the authentication prompt and executing on the second computing device. In one embodiment, the information includes a name of the application, and the determining includes determining whether the stored set of user credentials includes a user credential associated with the name of the application. In some embodiments, the information includes a domain name associated with a website determined by the second computing device to be associated with the application. In some embodiments, the authentication prompt is a webpage presented by the second computing device, and the indication identifies a domain name associated with the webpage.

In step 1220, the first computing device presents a selection prompt (e.g., prompt 932) asking a user of the first computing device to select one of the stored set of user credentials to provide to the second computing device for authentication to the service, the selection prompt identifying the relevant user credential (e.g., credential suggestion 934). In some embodiments, the first computing device provides the selected user credential to the second computing device to input into one or more fields of the authentication prompt. In some embodiments, the first computing device presents a prompt (e.g., device authentication prompt 1110) asking the user to supply an input depicted on a display (e.g., display 920) associated with the second computing device and usable to authenticate the first computing device to the second computing device. In such an embodiment, in response to the user supplying the input, the first computing device establishes an encrypted channel (e.g., secure channel at 1024) with the second computing device to communicate the selected user credential. In some embodiments, the first computing device determines that the first computing device and the second computing device are registered to the same account of a cloud service; based on the first and second computing devices being register to the same account, exchanges a shared secret between the first and second computing devices; and communicates the selected user credential via an encrypted channel established based on the shared secret. In some embodiments, the selection prompt is presented by an application that is executable by the first computing device to remotely control operation of a media player device. In some embodiments, the selection prompt is presented by an operating system of the first computing device, and the presenting includes the operating system presenting a keyboard on a display of the first computing device that is operable to provide a user input to the second computing device.

FIG. 12B depicts a flow diagram of another method 1230 for sharing a credential. In various embodiments, method 1230 is performed by a first computing device presenting an authentication prompt such as media player device 910. In some embodiments, steps may be performed concurrently or in a different order than shown.

In step 1235, the first computing device presents an authentication prompt (e.g., prompt 912) asking for a user credential to authenticate a user.

In step 1240, the first computing device sends a request (e.g., request 914) for the user credential to a second computing device and information (e.g., service identifier 916) usable by the second computing device to identify a relevant user credential (e.g., user credential 936) stored in the second computing device. In some embodiments, the authentication prompt is provided by an application executing at the first computing device and purporting to be associated with a service provided by a website. In such an embodiment, the first computing device verifies that the application is authorized to receive a user credential used to authenticate to the website and specifies a domain name of the website in the information sent to the second computing device. In one embodiment, the verifying includes retrieving information (e.g., list 340) from the website that is usable to confirm that the application is associated with the service (e.g., by cross referencing lists 340 and 342). In some embodiments, the authentication prompt is provided by an application executing at the first computing device, and the information includes a name of the application. In some embodiments, the authentication prompt is a webpage presented on a display of the first computing device, and the information includes a domain name associated with the webpage.

In step 1245, the first computing device receives, from the second computing device, a user credential selected by a user via a selection prompt (e.g., selection prompt 932) on the second computing device that depicts the identified relevant user credential (e.g., credential suggestion 934). In some embodiments, the first computing device presents a prompt (e.g., a prompt on media player device 910 corresponding to device authentication prompt 1110) asking the user to supply an input to the second computing device, the input being usable to authenticate the second computing device to the first computing device. In such an embodiment, responsive to authenticating the second computing device, establishing an encrypted channel (e.g., secure channel at 1024) with the second computing device, and the selected user credential is received via the encrypted channel. In some embodiments, the prompt asking the user to supply an input asks the user to input a value that is depicted on a display (e.g., display 920) associated with the first computing device.

In step 1250, the first computing device populates one or more fields in the authentication prompt with the received user credential.

Figure 12C:
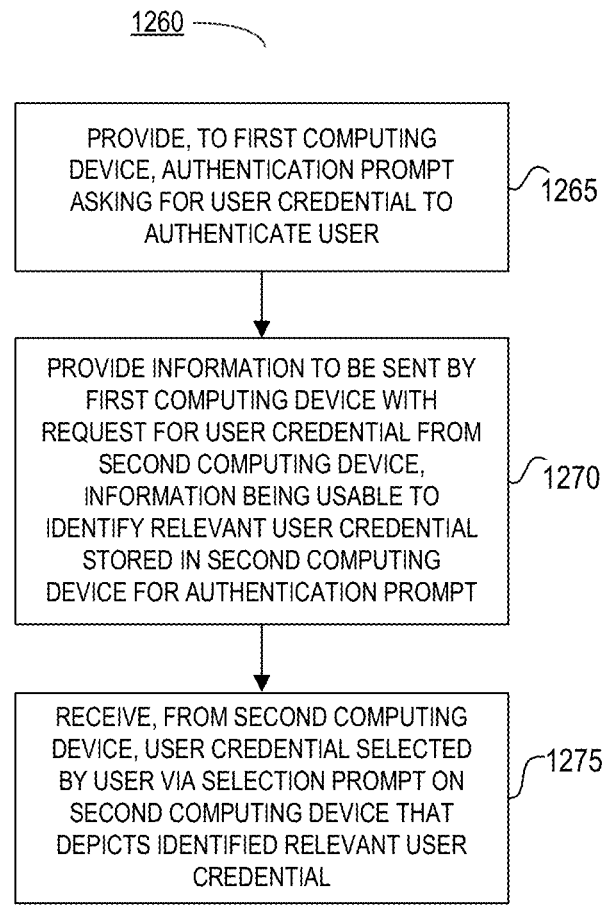

FIG. 12C depicts a flow diagram of another method 1260 for sharing a credential is depicted. In various embodiments, method 1260 is performed by an application attempting to authenticate a user such as an application executing on media player device 910. In some embodiments, steps may be performed concurrently or in a different order than shown.

Method 1260 begins at step 1265 with an application providing, to a first computing device (e.g. device 910), an authentication prompt (e.g., prompt 912) asking for a user credential to authenticate a user, the first computing device being configured to present the authentication prompt on a display (e.g., display 920) of the first computing device. In step 1270, the application provides information (e.g., list 342 and/or a service identifier 916) to be sent by the first computing device with a request (e.g., request 914) for the user credential from a second computing device (e.g., mobile device 930). In various embodiments, the information is usable by the second computing device to identify a relevant user credential stored in the second computing device for the authentication prompt. In some embodiments, step 1270 includes the application identifying a domain name associated with a desired user credential, and the first computing device is configured to verify that the application is authorized to receive a user credential associated with the domain name prior to including the domain name in the provided information. In step 1275, the application receiving, from the second computing device, a user credential (e.g., credential 936) selected by a user via a selection prompt (e.g., prompt 932) on the second computing device that depicts the identified relevant user credential (e.g., credential suggestion 934). In some embodiments, the application provides the received user credential to a website associated with the domain name to authenticate the user.

Exemplary Computer System

Figure 13:
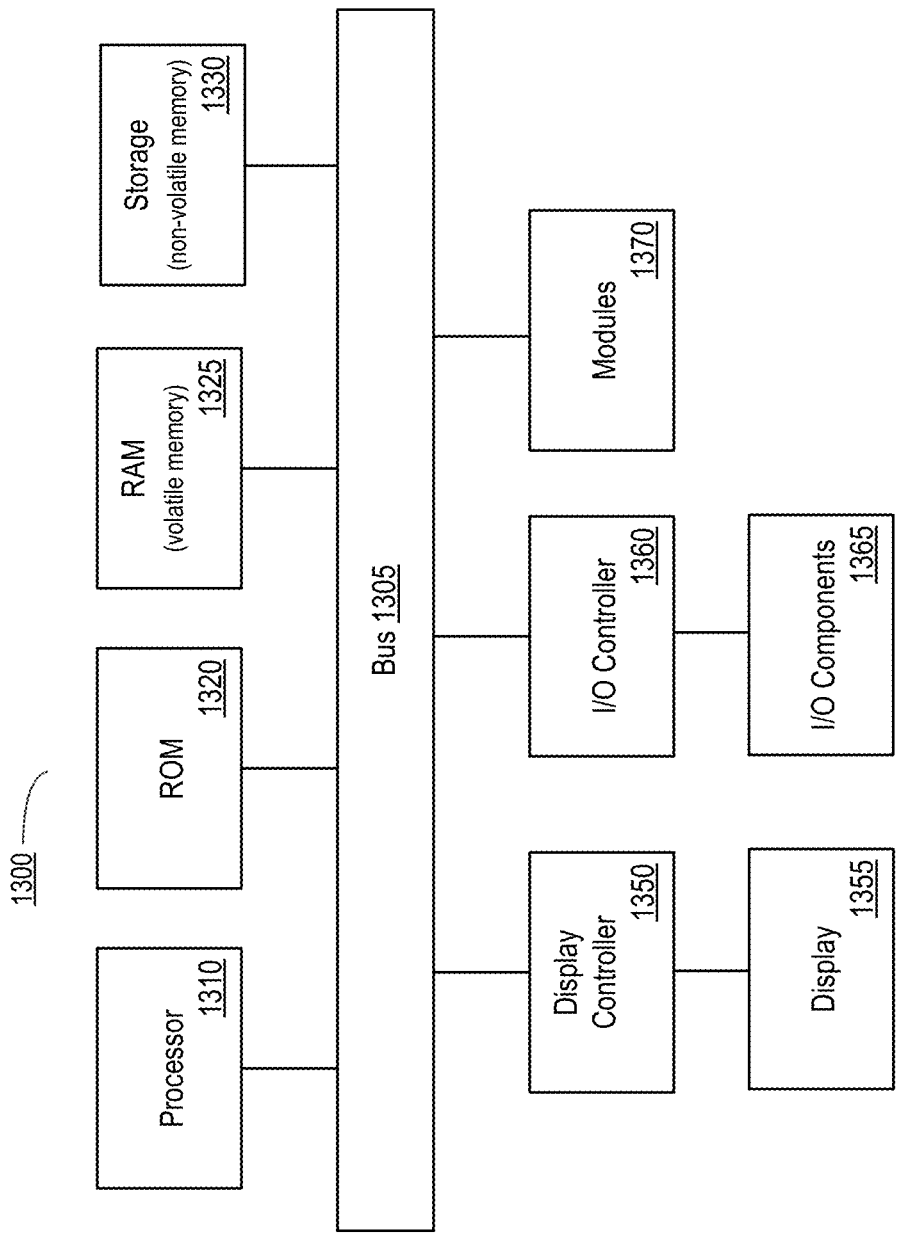
FIG. 13 is a block diagram illustrating an example computing system that may be used in conjunction with one or more of the embodiments.

FIG. 13 is a block diagram illustrating an example computing system that may be used in conjunction with one or more of the embodiments of the disclosure. For example, computing system 1300 (or system, or computing device, or device) may represent any of the devices or systems (e.g. client device 109-111) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1300 may include a bus 1305 which may be coupled to a processor 1310, ROM (Read Only Memory) 1320, RAM (or volatile memory) 1325, and storage (or non-volatile memory) 1330. The processor 1310 may retrieve stored instructions from one or more of the memories 1320, 1325, and 1330 and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1325 may be implemented as, for example, dynamic RAM (DRAM), or other types of memory that require power continually in order to refresh or maintain the data in the memory. Storage 1330 may include, for example, magnetic, semiconductor, tape, optical, removable, non-removable, and other types of storage that maintain data even after power is removed from the system. It should be appreciated that storage 1330 may be remote from the system (e.g. accessible via a network).

A display controller 1350 may be coupled to the bus 1305 in order to receive display data to be displayed on a display device 1355, which can display any one of the user interface features or embodiments described herein and may be a local or a remote display device. The computing system 1300 may also include one or more input/output (I/O) components 1365 including mice, keyboards, touch screen, network interfaces, printers, speakers, and other devices. Typically, the input/output components 1365 are coupled to the system through an input/output controller 1360.

Modules 1370 (or components, units, functions, or logic) may represent any of the functions or engines described above. Modules 1370 may reside, completely or at least partially, within the memories described above, or within a processor during execution thereof by the computing system. In addition, modules 1370 can be implemented as software, firmware, or functional circuitry within the computing system, or as combinations thereof.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to improve the delivery to users of invitational content or any other content that may be of interest to them. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A non-transitory computer readable medium having program instructions stored therein that are executable by a first computing device to cause the first computing device to perform operations comprising:
   exchanging a shared secret with a second computing device to establish a secure channel between an application executing on the first computing device and the second computing device;
   communicating with a third computing device that the application purports to be associated with in order to verify that the application is authorized to receive a credential from the second computing device, the credential being usable by a user to login to a service associated with the application, wherein the verification includes:
      using stored domain information to retrieve, from the third computing device, one or more files describing association information between the service and the application; and
      comparing a stored application identifier of the application with an application identifier of the service in the one or more files;
   sending, via the secure channel to the second computing device, a request for the credential;
   receiving, via the secure channel from the second computing device, the credential, which has been selected on the second computing device via a selection prompt; and
   providing the received credential to authenticate the user for login to the service.

2. The computer readable medium of claim 1, wherein the operations further comprise:
   identifying the service provided by the third computing device based on stored data about the application.

3. The computer readable medium of claim 1, wherein the credential is for a website that is associated with the application.

4. The computer readable medium of claim 1, wherein the verification is a cross-association verification.

5. The computer readable medium of claim 4, wherein the verification further includes verification of a signature of data received from the third computing device.

6. The computer readable medium of claim 2, wherein the exchanging, identifying, and sending are performed automatically based on user selection of the application without explicit user input requesting the exchanging or identifying.

7. The computer readable medium of claim 1, wherein the operations comprise:
   presenting a prompt asking the user to supply an input to the second computing device; and
   responsive to the supplied input, establishing the secure channel with the second computing device, wherein the received credential is received via the secure channel.

8. A method, comprising:
   communicating, by an application executed by a first computing device, with a third computing device that the application purports to be associated with in order to verify that the application is authorized to receive a credential from a second computing device, the credential being usable by a user to login to a service associated with the application, wherein the verification includes:
      using stored domain information to retrieve, from the third computing device, one or more files describing association information between the service and the application; and
      comparing a stored application identifier of the application with an application identifier of the service in the one or more files;
   providing, by the application, a request for the credential to the second computing device, wherein the request is sent by the first computing device to the second computing device via an encrypted channel established using an exchanged shared secret;
   receiving, by the application and from the second computing device, a credential selected by the user via a selection prompt on the second computing device, wherein the credential is received from the second computing device via the encrypted channel; and
   providing the received credential to authenticate the user for login to the service.

9. The method of claim 8, further comprising:
   identifying the service provided by the third computing device based on stored data about the application.

10. The method of claim 8, wherein the credential is for a website that is associated with the application.

11. The method of claim 8, wherein the verification is a cross-association verification.

12. The method of claim 11, wherein the verification further includes verifying a signature of data received from the third computing device.

13. The method of claim 9, wherein the identifying and sending are performed automatically based on user selection of the application without explicit user input requesting the exchanging or the identifying.

14. The method of claim 8, further comprising:
   presenting a prompt associated with the application asking for the credential, wherein the request includes a name associated with the application.

15. An apparatus comprising:
one or more processors; and
one or more memories having program instructions stored thereon that are executable by the one or more processors to:
- exchange a shared secret with a second computing device to establish a secure channel between an application executing on the apparatus and the second computing device;
- communicate with a third computing device that the application purports to be associated with in order to verify that the application is authorized to receive a credential from the second computing device, the credential being usable by a user to login to a service associated with the application, wherein the verification includes:
  - using stored domain information to retrieve, from the third computing device, one or more files describing association information between the service and the application; and
  - comparing a stored application identifier of the application with an application identifier of the service in the one or more files;
- send, via the secure channel to the second computing device, a request for the credential;
- receive, via the secure channel from the second computing device, the credential, which has been selected on the second computing device via a selection prompt; and
- provide the received credential to authenticate the user for login to the service.

16. The apparatus of claim 15, wherein the instructions are further executable to:
identify the service provided by the third computing device based on stored data about the application.

17. The apparatus of claim 15, wherein the credential is for a website that is associated with the application.

18. The apparatus of claim 15, wherein the verification is a cross-association verification.

19. The apparatus of claim 18, wherein the verification further includes verification of a signature of data received from the third computing device.

* * * * *